United States Patent Office 3,544,302
Patented Dec. 1, 1970

3,544,302

PHYTOTOXIC COMPOSITIONS AND METHODS

Philip C. Hamm, Glendale, Mo., assignor to Monsanto Company, St. Louis, Mo., a corporation of Delaware No Drawing. Filed Sept. 15, 1967, Ser. No. 668,216
Int. Cl. A01n 9/12
U.S. Cl. 71—90 16 Claims

ABSTRACT OF THE DISCLOSURE

Compositions comprising a benzothiazoline of the formula

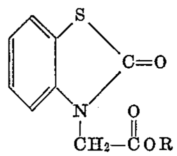

and a picolinate of the formula

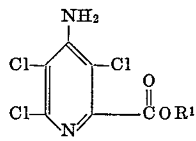

wherein R and $R^1$ are each selected from the group consisting of hydrogen, alkyl of not more than 12 carbon atoms and a salt-forming cation, said benzothiazoline being present in an amount from about 0.01 part to about 10 parts by weight per one part of picolinate. The compositions exhibit unexpected phytotoxic activity.

This invention relates to phytotoxic compositions and to methods of controlling the growth of plants.

The term "phytotoxicant" as used herein and in the appended claims means materials which (1) effectively control all plants in a given locus or (2) selectively control the growth of one or more plant species in the presence of other plants. In like manner, "phytotoxic" and "phytotoxicity" are used to identify the overall and selective control activity of the compositions of this invention.

The term "plant" as used herein and in the appended claims is inclusive of dormant seeds, germinant seeds, germinative seeds, emerging seedlings and established woody and herbaceous vegetation including the roots and above-ground portions.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The term "phytotoxic formulation" as used herein means a benzothiazoline/picolinate composition of this invention in combination with an adjuvant.

In accordance with this invention it has been discovered that phytotoxic compositions comprising certain 2-oxo-3-benzothiazolines and certain picolinates exhibit phytotoxic effectiveness not possessed by either component employed alone. The phytotoxic compositions of this invention produce phytotoxic results substantially greater than the sum of the results for each component alone. The compositions are particularly effective for the control of woody and herbaceous plants. Maximum control of woody and herbaceous plants is attained in a much shorter time than with either component alone. In addition, the phytotoxic compositions are surprisingly selective. They are non-toxic to many crop plants, particularly corn and wheat, and thus can be used in the control of both monocotyledonous and dicotyledonous weed plants in crop plants.

The compositions of this invention comprise a benzothiazoline of the formula

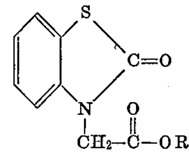

and a picolinate of the formula

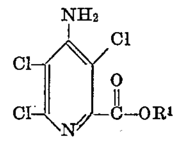

wherein R and $R^1$ are each selected from the group consisting of hydrogen, alkyl or not more than 12 carbon atoms and a salt-forming cation, said benzothiazole being present in an amount from about 0.01 part to about 10 parts by weight per one part by weight of picolinate.

The preferred phytotoxic compositions contain from about 0.05 part to about 1 part by weight of benzothiazoline per 1 part by weight picolinate.

In the above formulae R and $R^1$ can be any salt-forming cation, for example, alkali metal (Na, K, Li, Rb and Cs), alkaline earth metal (Ca, Sr and Ba), magnesium, copper, iron, zinc, cobalt, nickel, ammonium and aliphatic-substituted ammonium.

The aliphatic-substituted ammonium salts are those prepared from low molecular aliphatic amines, i.e., having a molecular weight below about 300, and more particularly the alkyl amines, alkylene amines and alkanol amines containing not more than 2 amine groups such as methylamine, ethylamine, n-propylamine, isopropylamine, n-butylamine, isobutylamine, sec-butylamine, n-amylamine, iso-amylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, methylethylamine, methylisopropylamine, methylhexylamine, methylnonylamine, methylpentadecylamine, methyloctadecylamine, ethylbutylamine, ethylheptylamine, ethyloctylamine, hexylheptylamine, hexyloctylamine, dimethylamine, diethylamine, di-n-propylamine, diisopropylamine, di-n-amylamine, diisoamylamine, dihexylamine, diheptylamine, dioctylamine, trimethylamine, triethylamine, tri-n-propylamine, triisopropylamine, tri-n-butylamine triisobutylamine, tri-sec-butylamine, tri-n-amylamine, ethanolamine, n-propanolamine, isopropanolamine, diethanolamine, tri-N-ethylethanolamine, N-ethylpropanolamine, N-butylethanolamine, allylamine, n-butenyl-2-amine, n-pentenyl-2-amine, 2,3-dimethylbutenyl-2-amine, dibutenyl-2-amine, n-hexenyl-2-amine and propylenediamine. In the above formula R and $R^1$ as alkyl can be methyl, ethyl, propyl, isopropyl, n-butyl, sec-butyl, isobutyl, amyl, hexyl, heptyl, octyl, nonyl, dodecyl and the like.

For the sake of brevity and simplicity, the term "active ingredient" is used hereinafter in this specification to describe the above benzothiazoline/picolinate compositions of this invention.

In practicing the phytotoxic or herbicidal methods of this invention the active ingredients can be used alone or in combination with a material referred to in the art as an adjuvant in liquid or solid form. Phytotoxic formulations are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as a finely-divided particulate solid, a liquid of organic origin, water, a wetting agent, dispersing agent, an emulsifying agent or any suitable combination of these. The phytotoxic formulations usually contain from about 0.01 percent to about 99 percent by weight of active ingredient.

Typical finely-divided solid carriers and extenders which can be used with the active ingredients include for example, the talcs, clays, pumice, silica, diatomaceous, earth, quartz, fuller's earth, salt, sulfur, powdered cork, powdered wood, ground corn cobs, walnut flour, chalk, tobacco dust, charcoal, volcanic ash, cottonseed hulls, wheat flour, soybean flour, tripoli and the like. Typical liquid diluents include for example, kerosene Stoddard solvent, hexane, water, benzene, toluene, acetone, ethylene dichloride, xylene, alcohols, diesel oil, glycols and the like.

Phytotoxic formulations, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

The following examples will illustrate the invention. In these examples, as well as in the specification and appended claims, parts and percent are by weight unless otherwise indicated.

EXAMPLE

The phytotoxic activity of the active ingredients of this invention is demonstrated as follows: Established trees about 18 inches in height were sprayed with an aqueous emulsion containing various amounts of active ingredient. Each component of the active ingredient is also separately sprayed on established trees by the same method.

The phytotoxic activity index is based on the average percent control of each tree lot. The phytotoxic activity index is converted to a relative scale for the sake of brevity and simplicity.

The phytotoxic acivity index used in Table I is defined as follows:

| Average percent control | Scale |
|---|---|
| 0 to 25 | 0 |
| 26 to 50 | 1 |
| 51 to 75 | 2 |
| 76 to 99 | 3 |
| 100 (trees dead) | K |

The trees were observed at intervals after spraying and the results recorded. The number in the "Elapsed Time" columns in Table I represents the number of days between spraying and the results shown in the respective "Phytotoxic Activity" columns.

TABLE I.—PHYTOTOXIC ACTIVITY OF BENZOTHIAZOLINE/PICOLINATE COMPOSITIONS

| | Maple | | | Arborvitae | | | Green ash | | |
|---|---|---|---|---|---|---|---|---|---|
| Compound | Rate lbs./acre | Phytotoxic activity | Elapsed time, days | Rate, lbs./acre | Phytotoxic activity | Elapsed time, days | Rate, lbs./acre | Phytotoxic activity | Elapsed time days |
| A[1] | 5 | 3 | 130 | 3 | K | 150 | 5 | 1 | 130 |
| B[2] | ½ | K | 65 | ½ | K | 115 | 2 | 3 | 130 |
| | ¼ | K | 75 | ¼ | K | 103 | 1 | 3 | 130 |
| | ⅛ | K | 105 | ⅛ | 2 | 115 | ½ | 3 | 90 |
| A[1]+B[2] | 5+½ | K | 14 | 3+½ | K | 50 | 5+2 | K | 65 |
| | 5+¼ | K | 27 | 3+¼ | K | 45 | 5+1 | K | 50 |
| | 5+⅛ | K | 30 | 3+⅛ | K | 98 | 5+½ | K | 75 |

[1] Compound A is ethyl-2-oxo-3-benzothiazolineacetate.
[2] Compound B is potassium-4-amino-3,5-6-trichloropicolinate.

The data in Table I above show the unexpected phytotoxic effectiveness of the active ingredients of this invention. The active ingredients completely controlled the trees and in a substantially shorter time than would be expected from the most effective response to each component alone.

As mentioned hereinbefore the phytotoxic compositions of this invention can be admixed with one or more adjuvants which can be solid or liquid extenders, carriers, diluents, conditioning agents and the like. Preferred phytotoxic formulations containing the active ingredients of this invention have been developed so that the active ingredients can be used to the greatest advantage to modify the growth of plants. The preferred formulations comprise wettable powders, aqueous suspensions, dust formulations, granules, emulsifiable oils and solutions in solvents. In general, these preferred formulations can all contain one or more surface-active agents.

Surface-active agents which can be used in the phytotoxic formulations of this invention are set out, for example, in Searle U.S. Pat. 2,426,417, Todd U.S. Pat. 2,655,447, Jones U.S. Pat. 2,412,510 and Lenher U.S. Pat. 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), by J. W. McCutcheon, Inc., and Bulletin E-607 of the Bureau of Entomology and Plant Quarantine of the U.S.D.A. In general, less than 50 parts by weight of the surface active agent is present per 100 parts by weight of phytotoxic composition.

Wettable powders are water-dispersible formulations containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylinic glycols, polyoxyethylene derivatives of alkylphenols (particularly isooctylphenol and nonylphenyl) and polyoxyethylene derivatives of the monohigher fatty esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N - methyl - N-(long chain acid) taurates.

Wettable powder formulations usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total formulation. Where required from about 0.1 to 2.0 parts by weight of the solid inert extender can be replaced by a corrosion inhibitor or anti-foaming agent or both.

Aqueous suspensions can be prepared by mixing together and grinding an aqueous slurry of water-insoluble active ingredient in the present of dispersing agents to obtain a concentrated slurry of very finely-divided particles. The resulting concentrated aqueous suspension is characterized by its extremely small particle size, so that when diluted and sprayed coverage is very uniform.

Dusts are dense finely-divided particulate formulations which are intended for application to the soil in dry form. Dusts are characterized by their free-flowing and rapid settling properties so that they are not readily wind-borne to areas where they are of no value. Dusts contain primarily an active ingredient and a dense, free-flowing finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be either of vegetable or mineral origin. The solid extenders are characterized by possessing relatively low surface areas and are poor in liquid absorption. Suitable inert solid extenders for phytotoxic dusts include micaceous talcs, pyrophyllite, dense kaolin clays, ground calcium phosphate rock and tobacco dust. The dusts usually contain from about 0.5 to 95 parts active ingredient, 0 to 50 parts grinding aid, 0 to 50 parts wetting agent and 5 to 99.5 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. Suitable surface active agents are anionic, cationic and non-ionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 50 parts surface active agent and about 4 to 94 parts solvent, all parts being by weight based on the total weight of emulsifiable oil.

Granules are physically stable particulate formulations comprising active ingredient adhering to or distributed through a basic matrix of an inert, finely-divided particulate extender. In order to aid leaching of the active ingredient from the particulate, a surface active agent such as those listed hereinbefore under wettable powders can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitic clays. These extenders are sprayed or blended with the active ingredient to form the phytotoxic formulations.

The mineral particles which are used in the phytotoxic formulations usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the phytotoxic formulations. The term "mesh" as used herein means U.S. Sieve Series.

The granular phytotoxic formulations generally contain from about 5 parts to about 30 parts by weight of active ingredient per 100 parts by weight of clay and 0 to about 5 parts by weight of surface active agent per 100 parts by weight of particulate clay. The preferred granular formulations contain from about 10 parts to about 25 parts by weight of active ingredient per 100 parts by weight of clay.

The phytotoxic formulations can also contain other additaments, for example fertilizers, other phytotoxicants, plant growth regulants, pesticides and the like used as adjuvant or in combination with any of the above-described adjuvants.

Fertilizers useful in combination with the active ingredients include for example ammonium nitrate, urea, potash, and superphosphate. Other useful additaments include materials in which plant organisms take root and grow such as compost, manure, humus, sand and the like.

When operating in accordance with the present invention, effective amounts of the active ingredients are dispersed in or on soil or plant growth media and/or applied to above ground portions of plants in any convenient fashion. Application to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid phytotoxic formulations to the surface of soil or to above ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The application of an effective amount of the active ingredients of this invention to the soil or growth media and/or plant is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment for the modification of vegetative growth, the active ingredients are applied in amounts from about 1 to about 50 or more pounds per acre. In applications to soil for the modification of the growth of germinant seeds, germinative seeds, emerging seedlings and established vegetation, the active ingredients are applied in amounts from about 0.001 to about 25 or more pounds per acre. In such soil applications, it is desirable that the active ingredients be distributed to a depth of at least 0.2 inch. In selective pre-emergence phytotoxic applications the active ingredients are usually applied in amounts from about 0.001 to 5 pounds per acre. It is believed that one skilled in the art can readily determine from the teachings of this specification, including examples, the general procedure for any application.

The terms "soil" and "growth media" are employed in the present specification and claims in their broadest sense to be inclusive of all conventional "soils" as defined in Webster's New International Dictionary, Second Edition, Unabridged (1961). Thus, the terms refer to any substance or media in which vegetation may take root and grow, and are intended to include not only earth but also compost, manure, muck, humus, sand and the like, adapted to support plant growth.

The benzothiazolines useful in the compositions and methods of this invention can be prepared, e.g. by the processes set forth in U.S. Pat. 3,069,429.

The picolinates useful in the compositions and methods of this invention can be prepared, e.g. by the processes set forth in U.S. Pat. 3,325,272. The picolinates also can be prepared, e.g. by chlorination of p-nitropicolinic acid in the presence of a metallic catalyst such as $FeCl_3$ at a temperature above about 150° C. followed by the catalytic reduction of the p-nitro group by various methods well known in the art to form 4-amino-3,5,6-trichloropicolinic acid. The salts of the 4-amino-3,5,6-trichloropicolinic acid can be prepared by admixing the acid with the appropriate base in aqueous medium and evaporating to dryness. Salts derived from hydroxides which are insoluble in water or difficultly soluble in water can be prepared by reacting the sodium salt of the picolinic acid with the appropriate metallic chloride in a metathetical reaction. The esters can be prepared by heating the 4-amino - 3,5,6 - trichloropicolinic acid with thionyl chloride to produce the intermediate 4-amino-3,5,6-trichloropicolinyl chloride and thereafter heating the acid chloride thus obtained with the appropriate hydroxy compound in pyridine to produce the desired ester.

Although the invention is described with respect to specific modifications, the details thereof are not to be construed as limitations except to the extent indicated in the following claims.

The embodiments of the invention in which an exclusive property or privilege is claimed are defined as follows:

1. Method which comprises exposing a woody plant to a phytotoxic amount of a composition comprising in combination a benzothiazoline of the formula

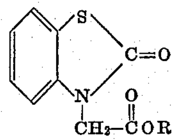

and a picolinate of the formula

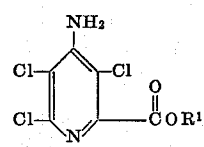

wherein R and $R^1$ are each selected from the group consisting of hydrogen, alkyl of not more than 12 carbon atoms and a salt-forming cation, said benzothiazoline being present in an amount from about 0.01 part to about 10 parts by weight per one part of picolinate.

2. Method of claim 1 wherein R and $R^1$ are a salt-forming cation.

3. Method of claim 1 wherein R and $R^1$ are alkyl.

4. Method of claim 1 wherein R is alkyl and $R^1$ is a salt-forming cation.

5. Method of claim 1 wherein the benzothiazoline is present in an amount from about 0.5 to about 1 part by weight per 1 part by weight of picolinate.

6. Method of claim 1 wherein the benzothiazoline is ethyl-2-oxo-3-benzothiazolineacetate.

7. Method of claim 1 wherein the picolinate is potassium-4-amino-3,5,6-trichloropicolinate.

8. Method of claim 1 wherein the benzothiazoline is ethyl-2-oxo-3-benzothiazolineacetate and the picolinate is potassium-4-amino-3,5,6-trichloropicolinate.

9. Herbicidal composition comprising in combination a benzothiazoline of the formula

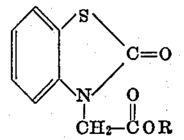

and a picolinate of the formula

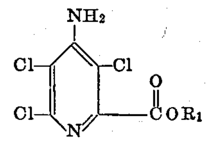

wherein R and $R^1$ are each selected from the group consisting of hydrogen, alkyl of not more than 12 carbon atoms and a salt-forming cation, said benzothiazoline being present in an amount from about 0.01 part to about 10 parts by weight per one part of picolinate.

10. Composition of claim 9 wherein R and $R^1$ are a salt-forming cation.

11. Composition of claim 9 wherein R and $R^1$ are alkyl.

12. Composition of claim 9 wherein the benzothiazoline is present in an amount from about 0.5 to about 1 part by weight per 1 part by weight of picolinate.

13. Composition of claim 9 wherein the benzothiazoline is ethyl-2-oxo-3-benzothiazolineacetate and the picolinate is potassium-4-amino-3,5,6-trichloropicolinate.

14. Composition of claim 9 together with a particulate solid adjuvant.

15. Composition of claim 9 together with a liquid adjuvant

16. Composition of claim 9 together with a surface-active agent.

References Cited

UNITED STATES PATENTS

| | | | |
|---|---|---|---|
| 3,069,429 | 12/1962 | Godson et al. ------ | 71—90 X |
| 3,325,272 | 6/1967 | Hamaker et al. ----- | 71—94 X |

JAMES O. THOMAS, Jr., Primary Examiner

U.S. Cl. X.R.

71—94